Oct. 24, 1950      J. S. MACKAY      2,527,315
PREPARATION OF UREA
Filed April 14, 1948
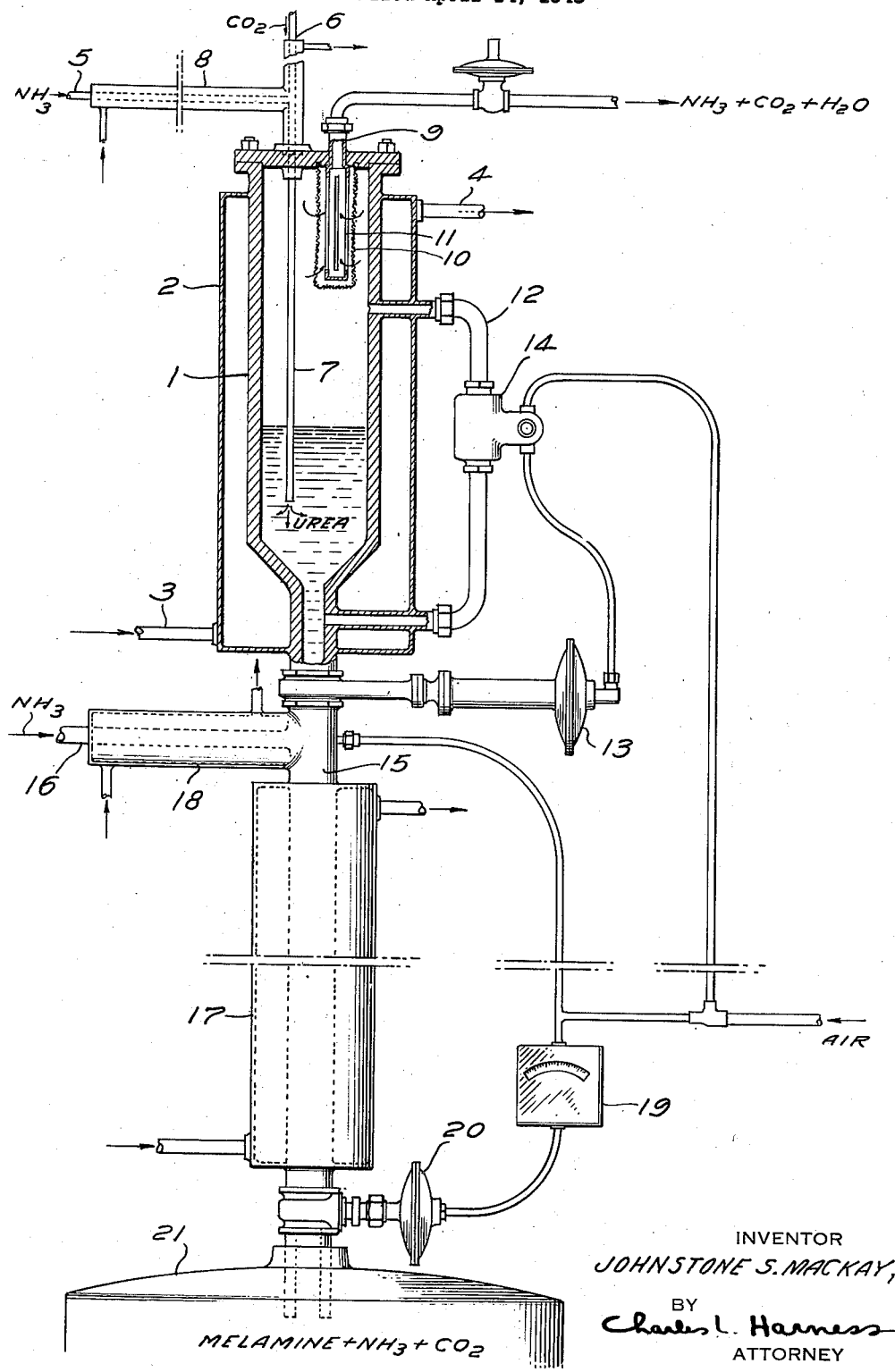
INVENTOR
JOHNSTONE S. MACKAY,
BY
Charles L. Harness
ATTORNEY Patented Oct. 24, 1950

2,527,315

UNITED STATES PATENT OFFICE 2,527,315

PREPARATION OF UREA

Johnstone S. Mackay, Old Greenwich, Conn., assignor to American Cyanamid Company, New York, N. Y., a corporation of Maine Application April 14, 1948, Serial No. 21,035

8 Claims. (Cl. 260—555)

The present invention relates to an improved method for the preparation of urea.

An object of the present invention is to prepare a substantially anhydrous urea directly.

A further object is to prepare such urea cyclically.

A still further object is to prepare urea in such a way that it is available for reaction in the molten condition in the substantial absence of water.

Other objects of the present invention will be made apparent from the discussion hereinafter.

A molten substantially anhydrous urea is preferred in the preparation of various of its derivatives such as melamine, guanamines, and the like. However, so far as the applicant is aware, urea suitable for the above-named preparations has been obtainable in the past only by recovering the urea admixed with the reactants ammonia and carbon dioxide and by-product water, and driving off these contaminants by applied heat, such as by heating the urea on a revolving drum or by other similar means. The old method thus required that urea be separated and dried before use; this involves tying up costly equipment and the expenditure of fuel, both of which measures are avoided in the present invention.

It has been discovered that substantially anhydrous urea may be prepared by reacting ammonia and carbon dioxide under pressure at temperatures above the melting point of urea, thus forming molten urea and water, while simultaneously maintaining the partial pressure of the water at a point low enough to keep it in vapor form at the temperature and pressure employed in making the urea.

The substantially anhydrous molten urea contemplated in the present invention can be made at any temperature above its melting point of 132° C. Owing to the greater cost of apparatus capable of being used at extremely high pressures, it is preferred to use the lowest pressures consistent with rapid and efficient production. However, the pressures employed must not be so low that urea will not be formed in suitable yields. Thus, the lower pressure limit is about 1000 lbs./sq. in. The preferred temperature and pressure are respectively about 200° C. and about 2000 lbs./sq. in. Under these preferred conditions water will remain in the vapor phase only if its partial pressure is less than 225 lbs./sq. in. The remaining pressure can be made up of an excess of either reactant or any other gas that will not interfere with the reaction, as for example, nitrogen or the like.

The quantity of diluting gas required varies with the temperature and pressure of the system, but may be readily calculated. For example, assume that one wishes to form urea at approximately its melting point of 132° C. By reference to standard steam tables such as those appearing in Lange's "Handbook of Chemistry," fifth edition, page 1456, the vapor pressure of steam at this temperature is found to be about 42 lbs./sq. in. Now urea cannot be formed quickly at this temperature at pressures lower than about 1000 lbs./sq. in. by any means known to the applicant. Assuming then that the system will be maintained at a pressure of about 1000 lbs./sq. in., a partial pressure of 1000-42, or 958, lbs./sq. in. must come from other gases if water is to be maintained in the vapor phase. If ammonia and carbon dioxide are reacted in the urea-forming vessel at a rate required to convert 50% of the carbon dioxide to urea, the over-all reaction will read:

$$2NH_3 + 2CO_2 \rightarrow (NH_2)_2CO + H_2O + CO_2$$

Since the partial pressure of the water is 42 lbs./sq. in. as already determined, and by the terms of the reaction one mole of water is formed, then obviously under the equilibrium conditions of the reaction as described there will remain one mole of carbon dioxide unreacted, furnishing a partial pressure of 42 lbs./sq. in. Thus, the water and the carbon dioxide give a total pressure of 84 lbs./sq. in. The difference in 1000 and 84, namely 916, lbs./sq. in. may be supplied by introducing into the vessel a gas inert to urea such as nitrogen, or the like, under a pressure of 1000 lbs./sq. in. It is obvious that about 916 divided by 84, or roughly 11 moles of such inert gas, will be required. Although nitrogen alone may be used as the diluent, the yield of urea per unit time in such case is quite small. Larger yields may be obtained by mixing ammonia with the nitrogen, and the best yields are obtained by adding the entire 11 moles of diluent as ammonia rather than as nitrogen. The over-all reaction at 132° C. and 1000 lbs./sq. in. would then read:

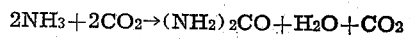

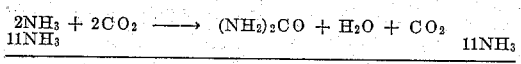

It may similarly be calculated that for the preferred conditions of about 200° C., about 2000 lbs./sq. in., and a carbon dioxide conversion rate of about 50%, the over-all reaction would be approximately:

$$10NH_3 + 2CO_2 \rightarrow (NH_2)_2CO + H_2O + CO_2 + 8NH_3$$

In the above equation it will be noted that incoming ammonia and carbon dioxide are reacted in the mole ratio of 5:1. Although the use of ammonia in excess has been described, the total pressure required could be made up, although with lowered yields, with carbon dioxide, nitrogen, or any other gas inert to urea.

Anhydrous urea may be formed at temperatures and pressures higher than 200° C. and 2000 lbs./sq. in., but the equipment required is disproportionately expensive and difficult to handle.

The urea described under the above-named conditions may be withdrawn from the vessel at a point that is out of contact with the water vapor. One method for doing this is to draw the urea from the bottom of the reaction vessel through a valved orifice. For a continuous operation of the process, the valve may be made dependent on the level of urea in the reaction vessel through such means as a valve actuating liquid level of any well known type.

If it is desired to recover the urea for storage or shipment as such, it is preferable to solidify it. One convenient means of accomplishing this end is to discharge the liquid urea onto a revolving drum colder than 132° C. in the presence of ammonia under sufficient pressure to prevent decomposition of the liquid urea. A suitable ammonia pressure is 500 lbs./sq. in. or higher. In conjunction with ammonia under pressure, numerous other well known means of solidifying liquid substances can also be used.

Although the urea produced by the above-described method can be recovered as a solid, it may also be used directly in the preparation of materials that require or at least tolerate the presence of ammonia under pressure. Examples of such uses are the preparation of melamine, guanamines, and the like, from urea, as noted above.

My invention will now be described more particularly by referring to the drawing, which shows one of the preferred embodiments of an apparatus for accomplishing the purposes of the invention.

In the drawing:

The figure is an elevation partly in section showing the urea-forming vessel and apparatus for forming melamine connected thereto.

Referring to the figure, there is shown at 1 a pressure-resistant reaction vessel which is preferably lined with a material substantially inert to the reactants such as silver or Hastelloy-B, an alloy composed of 60 parts nickel, 33 parts molybdenum, and 7 parts iron.

A heating jacket 2 substantially surrounds reaction vessel 1 and is provided with ports 3 and 4 for the ingress and egress of the heating medium such as steam or the like. Ammonia and carbon dioxide are passed into reaction vessel 1 through pipes 5 and 6, respectively, and preferably mingled in common pipe 7. The outlet of pipe 7 is preferably submerged below the surface of the urea, since this insures greater contact of the reacting materials and permits the system to reach equilibrium more rapidly. However, a liquid substantially anhydrous urea will form whether or not the tube is beneath the urea surface. This is particularly true in the initial stages of the process.

The ammonia and carbon dioxide inlets 5 and 6 are preferably surrounded by a heating jacket 8 for at least a portion of their length in order to bring the incoming gases up to reaction temperature. A vent 9 inserted in the reaction vessel passes off the residual gases, and is preferably protected by a screen 10 and a liquid trap 11 to inhibit clogging. Gas from vent 9 includes ammonia, carbon dioxide, and water vapor. Water can be stripped from this mixture by contacting the mixture with a dehydrating agent that will not react with ammonia or carbon dioxide, such as calcium chloride, or by condensing the mixed water, ammonia, and carbon dioxide, and separating the components by distillation, or by any other various suitable means known to the art but not shown. The remaining mixture of ammonia and carbon dioxide may be added to one of the incoming streams of "make-up" ammonia or carbon dioxide for further reaction in vessel 1. Thus, at option the processes may be made cyclic, due attention being given to the proper proportions of total gases, both those recycled and those from make-up sources, to keep the partial pressure of by-product water low enough to maintain said water in vapor phase. Under the preferred conditions of 200° C. and 2000 lbs./sq. in. pressure, the residual gas is composed of 8 parts ammonia, 1 part carbon dioxide, and 1 part water vapor, as compared with 10 parts ammonia and 2 parts carbon dioxide required as reactants. Thus, under the preferred conditions, 2 parts of make-up ammonia and 1 part make-up carbon dioxide are required for cyclic operation.

A liquid level tube 12 may maintain automatically the level of the liquid urea between fixed limits. When the urea level reaches a certain predetermined height in the levelling tube 12, it may operate to open a valve 13, normally closing the orifice in the bottom of the reaction chamber 1, through a well known liquid level actuating mechanism not specifically shown but contained in housing 14. The urea level in vessel 1 then falls until the valve operating mechanism closes valve 13. This means of controlling the urea level is merely by way of example and numerous equivalent means will occur to those skilled in the art.

The urea-forming apparatus is shown feeding molten urea to an apparatus for making melamine vapor. When valve 13 is opened, urea is forced into a heat and pressure zone 15 in which it is contacted by ammonia under pressure entering through pipe 16. Elements 15 and 16 are preferably surrounded by heating jackets 17 and 18, respectively, with means for ingress and egress of a heating medium such as steam or the like. When pressure in the melamine-forming zone reaches a predetermined value as shown in a pressure-sensitive gauge 19 or the like, said gauge operates to open by air pressure or other convenient means a valve 20, normally closed, whereby the gases present in the melamine-forming zone 15 are forced into a collector 21. By means of apparatus not shown but well known in the art, the melamine vapors may be chilled and solid melamine collected.

While the invention has been described with reference to specific embodiments, it is to be understood that it is not to be limited thereto but is to be construed broadly and restricted solely by the scope of the claims.

I claim:

1. A method of making urea which comprises passing ammonia and carbon dioxide into a closed reaction zone, said zone being maintained at a temperature of at least about 132° C. and a pressure of at least about 1000 lbs./sq. in., maintaining the partial pressure of by-product water from the reaction at a point where said water remains in vapor form by maintaining a partial pressure of a gas inert to urea in said zone at least equal to D, D being determined by the relationship $$D = C - (A + B)$$

in which A is the vapor pressure of water at the operating temperature of said zone, B is the partial pressure of vapors in the system excepting water vapor and said urea-inert gas, and C is the total pressure in said zone; said urea-inert gas being the same as or different from any of the gases supplying partial pressure B, whereby liquid substantially anhydrous urea is formed, and withdrawing the same.

2. The method of claim 1 in which unreacted ammonia and carbon dioxide are removed together with by-product water, the water is stripped out, and the ammonia and carbon dioxide are returned to the cycle.

3. The method of claim 1 in which the urea is withdrawn from the lower range of the reaction zone.

4. The method of claim 1 in which the reaction zone is maintained at a temperature of about 200° C. and at a pressure of about 2000 lbs./sq. in.

5. The method of claim 1 in which the urea-inert gas supplying partial pressure D is ammonia.

6. The method of claim 1 in which pressure C is about 2000 lbs./sq. in.

7. A method of making urea which comprises passing ammonia and carbon dioxide in the mole ratio of about 5:1 into a closed reaction zone, said zone being maintained at a temperature of about 200° C. and at a pressure of about 2000 lbs./sq. in., whereby liquid substantially anhydrous urea is formed, withdrawing the same from the lower range of said zone.

8. The method of claim 7 in which water is stripped from the unreacted ammonia and carbon dioxide after removal from the reaction zone, and the ammonia and carbon dioxide are returned to the cycle.

JOHNSTONE S. MACKAY.

REFERENCES CITED

The following references are of record in the file of this patent:

UNITED STATES PATENTS

| Number | Name | Date |
|---|---|---|
| 1,923,489 | Krase | Aug. 22, 1933 |
| 1,937,116 | Hetherington | Nov. 28, 1933 |
| 2,267,133 | Porter | Dec. 23, 1941 |